US011511629B2

(12) United States Patent
Oide et al.

(10) Patent No.: US 11,511,629 B2
(45) Date of Patent: Nov. 29, 2022

(54) ELECTRIFIED VEHICLE SYSTEM AND CONTROL METHOD OF CONTROLLING ELECTRIFIED VEHICLE

(71) Applicant: TOYOTA JIDOSHA KABUSHIKI KAISHA, Toyota (JP)

(72) Inventors: Shunsaku Oide, Susono (JP); Tomohiro Yamazaki, Mishima (JP); Fusahiro Tsukano, Susono (JP); Yuya Takahashi, Mishima (JP); Shinya Asaura, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 287 days.

(21) Appl. No.: 16/921,298

(22) Filed: Jul. 6, 2020

(65) Prior Publication Data

US 2021/0031635 A1 Feb. 4, 2021

(30) Foreign Application Priority Data

Aug. 1, 2019 (JP) ............................ JP2019-142294

(51) Int. Cl.

*B60L 9/00* (2019.01)
*B60L 15/20* (2006.01)
*B60K 6/20* (2007.10)

(52) U.S. Cl.

CPC ....... *B60L 15/2054* (2013.01); *B60L 15/2072* (2013.01); *B60K 6/20* (2013.01);

(Continued)

(58) Field of Classification Search

CPC ............. B60L 15/2054; B60L 15/2072; B60L 2240/423; B60L 2260/26; B60L 15/20;

(Continued)

(56) References Cited

U.S. PATENT DOCUMENTS 5,952,810 A * 9/1999 Yamada .................... H02P 6/20 318/700
9,315,114 B2 * 4/2016 Oono ...................... B60L 50/51

(Continued)

FOREIGN PATENT DOCUMENTS

JP 2002-364407 A 12/2002
JP 2010-200567 A 9/2010

(Continued)

OTHER PUBLICATIONS

English Translation of WO2013157313A1 (See WO2013157313A1_Eng_EPO.pdf) using Espacenet (Year: 2022).*

*Primary Examiner* — Adam M Alharbi
(74) *Attorney, Agent, or Firm* — Oliff PLC

(57) ABSTRACT

An electrified vehicle system includes an electric motor coupled to a drive wheel via a plurality of power transmission components and a control device. The control device is configured to act as: a feedforward control section configured based on a transfer function simulating vibration transmission characteristics of a power transmission system, receiving as an input a required torque of the electric motor from a driver, and outputting a base command torque of the electric motor; a timing estimation section estimating, based on information on the power transmission system, a timing at which a backlash between the plurality of power transmission components is eliminated; and a torque correction section applying, to the base command torque, a correction torque for reducing a vibration generated in the power transmission system due to elimination of the backlash, in response to an arrival of the timing estimated by the timing estimation section.

5 Claims, 9 Drawing Sheets

10
40
46
Control Device
Accelerator Position Sensor
16
Battery
Processor
40a
18
Memory
40b
PCU
20
14
44
30
28
26
24
22
14a
32
32a
42
12
34

(52) U.S. Cl.
CPC ..... *B60L 2240/423* (2013.01); *B60Y 2200/91* (2013.01); *B60Y 2200/92* (2013.01)

(58) Field of Classification Search
CPC ......... B60L 2240/421; B60L 2240/461; B60L 2260/44; B60L 2270/145; B60K 6/20; B60Y 2200/91; B60Y 2200/92; Y02T 10/64; Y02T 10/72
See application file for complete search history.

(56) References Cited

U.S. PATENT DOCUMENTS

2002/0060545 A1* 5/2002 Inagaki ................. H02P 25/098 318/629
2009/0322264 A1* 12/2009 Imura ................... B60L 15/025 318/400.09
2013/0184918 A1* 7/2013 Motosugi ................ B60L 15/20 701/22
2019/0337398 A1 11/2019 Fujiwara et al.

FOREIGN PATENT DOCUMENTS

JP WO2013157313 A1 * 10/2013 ................ B60L 7/14
WO 2014/054657 A1 4/2014
WO 2018/020679 A1 2/2018

* cited by examiner

40
ωm
ωw
Control Object
(Power Transmission
System PT)
Tmf
54c
52
Backlash Passage Time
Period Estimation
Section
Timing Estimation
Section
52a
54b
+
+
Tmb
50
F/F Control
Section F(s)
Tmr
θ < θbl
θ ≧ θbl
Tmc
0
54a
Correction Torque
Calculation Section
Torque Correction
Section
54

ELECTRIFIED VEHICLE SYSTEM AND CONTROL METHOD OF CONTROLLING ELECTRIFIED VEHICLE

CROSS-REFERENCE TO RELATED APPLICATION

The present disclosure claims priority under 35 U.S.C. § 119 to Japanese Patent Application No. 2019-142294, filed on Aug. 1, 2019. The content of which is incorporated herein by reference in its entirety.

BACKGROUND

Technical Field

The present disclosure relates to an electrified vehicle system and a control method of controlling an electrified vehicle.

Background Art

In an electrified vehicle including an electric motor for driving a drive wheel, the torque of the electric motor is transmitted to the drive wheel via a plurality of power transmission components including elements engaged with each other, such as gears. A backlash (looseness) is provided between these power transmission components. With the presence of this kind of backlash, in a scene in which a vehicle accelerates from a decelerating state or a scene in which it decelerates from an accelerating state, the power transmission system of the vehicle temporarily enters a dead band in which the torque of the electric motor is not transmitted to the drive wheel. After passing through this dead band, vibration due to the engagement of the elements, such as gears, (i.e., the elimination of the backlash) is generated in the power transmission system.

For example, WO 2018/020679 A1 discloses a control method of controlling an electrified vehicle. According to this control method, it is determined, based on a target torque command value for determining the power of an electric motor, whether or not the vehicle is in the dead band as described above. Then, when the vehicle is estimated to be in the dead band, the final torque command value for the electric motor is limited. In more detail, this final torque command value is set, based on the target torque command value, such that the vibration of the vehicle is reduced. In addition, for example, JP 2010-200567 A1 discloses a vibration reduction control device for an electrified vehicle having an electric motor as a power source. This vibration reduction control device includes a determination means for determining whether or not the torque transmission to a drive shaft is interrupted, and a vibration reduction control means for stopping a feedback calculation of a target torque value while it is determined that the interruption of the torque transmission to the drive shaft is continued.

SUMMARY

According to the control method disclosed in WO 2018/020679 A1, during the power transmission system of the vehicle being estimated to be in the dead band, the command torque of the electric motor is continuously limited. Therefore, when this kind of control method is used, the time required for passage of the dead band (i.e., a backlash passage time period) is increased. As a result, there is a concern that the responsiveness of acceleration or deceleration of the electrified vehicle may be lowered.

The present disclosure has been made to address the problem described above, and an object of the present disclosure is to provide an electrified vehicle system and a control method of controlling an electrified vehicle, which can reduce the vibration generated in a power transmission system due to elimination of a backlash (i.e., a backlash vibration) while reducing a decrease in the responsiveness of acceleration or deceleration of the electrified vehicle.

An electrified vehicle system according to the present disclosure includes: an electric motor coupled to a drive wheel via a plurality of power transmission components; and a control device configured to control the electric motor. The control device is configured to act as: a feedforward control section configured based on a transfer function simulating vibration transmission characteristics of a power transmission system from the electric motor to the drive wheel, receiving as an input a required torque of the electric motor from a driver, and outputting a base command torque of the electric motor; a timing estimation section estimating, based on information on the power transmission system, a timing at which a backlash between the plurality of power transmission components is eliminated; and a torque correction section applying, to the base command torque, a correction torque for reducing a vibration generated in the power transmission system due to elimination of the backlash, in response to an arrival of the timing estimated by the timing estimation section.

The information on the power transmission system may include an angular velocity of the electric motor and an angular velocity of the drive wheel. The timing estimation section may also calculate, based on a relative angular velocity of the angular velocity of the electric motor with respect to the angular velocity of the drive wheel, an integrated relative angle of the electric motor with respect to the drive wheel after a start of reduction of the backlash, and may further estimate that the timing is when a calculated integrated relative angle reaches a designated backlash amount.

The correction torque may have a phase opposite to a waveform of torque generated due to the elimination of the backlash and inputted into the power transmission system.

The torque correction section may include: an input torque setting section setting, as a stepped first predicted torque, a torque that is presumed to be generated due to the elimination of the backlash and inputted into the power transmission system; a filter processing section applying, to the first predicted torque, a filter processing to reduce a natural resonance frequency component of the power transmission system and outputting a second predicted torque; and a subtraction section subtracting the first predicted torque from the second predicted torque to calculate the correction torque.

A control method according to the present disclosure of controlling an electrified vehicle equipped with an electric motor coupled to a drive wheel via a plurality of power transmission components, and a control device including a feedforward control section configured based on a transfer function simulating vibration transmission characteristics of a power transmission system from the electric motor to the drive wheel includes: inputting, to the feedforward control section, a required torque of the electric motor from a driver; outputting, from the feedforward control section, a base command torque of the electric motor; estimating, based on information on the power transmission system, a timing at which a backlash between the plurality of power transmission components is eliminated; and applying, to the base command torque, a correction torque for reducing a vibration generated in the power transmission system due to elimination of the backlash, in response to an arrival of the estimated timing.

According to the electrified vehicle system and the control method of controlling an electrified vehicle of the present disclosure, first, the torsional vibration of the power transmission system associated with acceleration or deceleration of the vehicle can be reduced with the use of the feedforward control section configured based on the transfer function simulating the vibration transmission characteristics of the power transmission system.

Then, according to the electrified vehicle system and the control method of the present disclosure, the timing at which the backlash is eliminated is estimated by the timing estimation section, and the correction torque for reducing the backlash vibration is applied to the base command torque of the electric motor in response to the arrival of the timing. In other words, according to the electrified vehicle system and the control method of the present disclosure, during the power transmission system being estimated to be in the backlash passage time period (i.e., the dead band), the torque of the electric motor is not continuously limited contrary to the control method disclosed in WO 2018/020679 A1. Therefore, it is possible to reduce the deterioration of the responsiveness of the acceleration or deceleration of the vehicle as a result of performing the reduction of the backlash vibration.

As described above, according to the electrified vehicle system and the control method of the present disclosure, the backlash vibration can be reduced while reducing the deterioration of the responsiveness of the acceleration or deceleration of the electrified vehicle.

DETAILED DESCRIPTION

Figure 1:
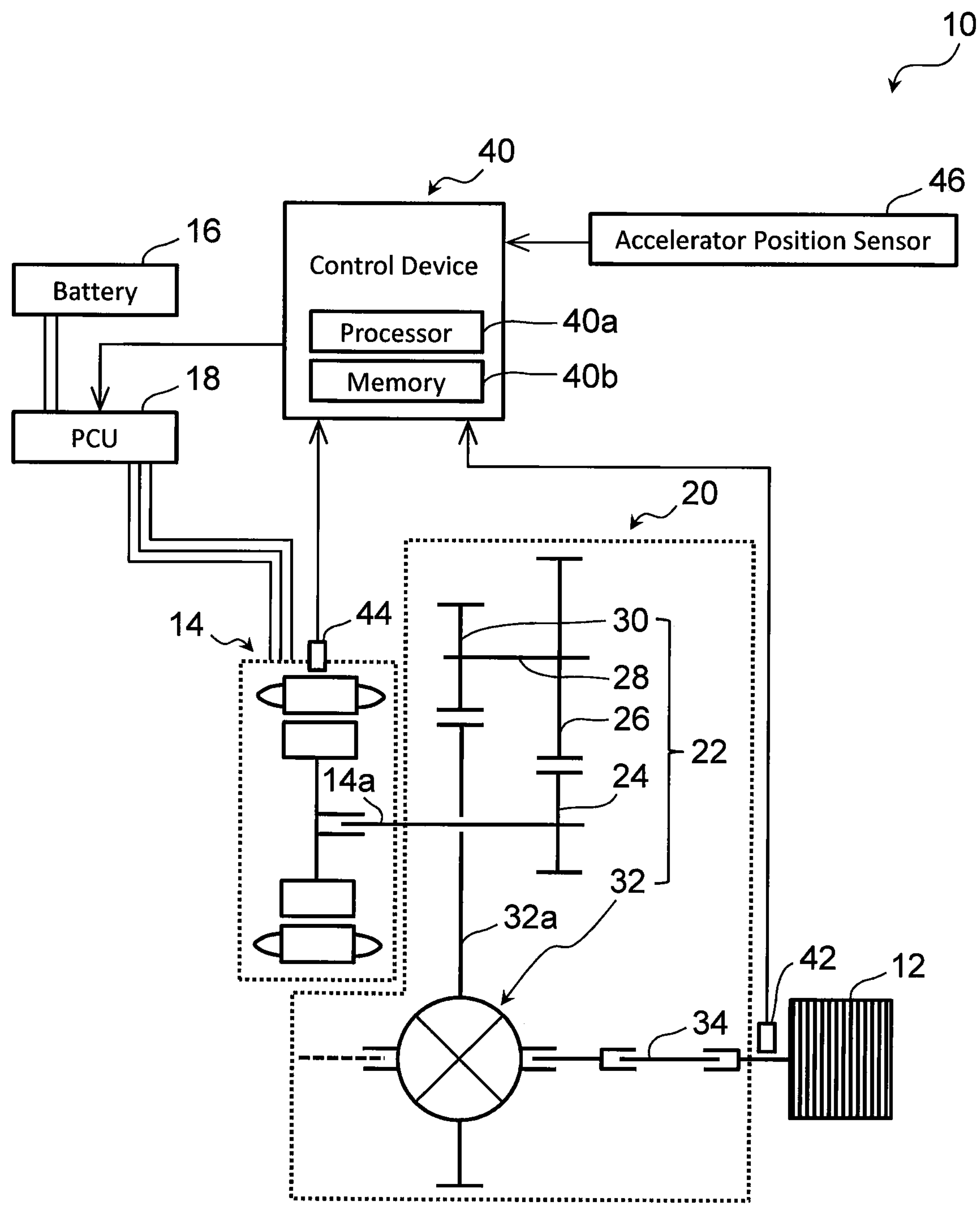
FIG. 1 is a schematic diagram used to describe an example of a configuration of an electrified vehicle system according to a first embodiment of the present disclosure.

In the following, embodiments of the present disclosure will be described with reference to the accompanying drawings. However, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

A first embodiment according to the present disclosure will be described with reference to FIGS. 1 to 6.

1-1. Example of Configuration of Electrified Vehicle System

FIG. 1 is a schematic diagram used to describe an example of the configuration of an electrified vehicle system 10 according to the first embodiment of the present disclosure. The electrified vehicle system 10 shown in FIG. 1 is provided with an electric motor 14 as a drive source of an electrified vehicle (hereinafter, simply referred to as a "vehicle"). That is to say, drive wheels 12 (in FIG. 1, only one of which is shown) of the vehicle to which the electrified vehicle system 10 is applied are driven using the electric motor 14. The electric motor 14 is, for example, a three-phase AC electric motor.

To be more specific, the electrified vehicle system 10 is further provided with a battery 16, a PCU (Power Control Unit) 18 and a power transmission device 20. The battery (DC power supply) 16 stores electric power supplied from the outside of the vehicle. The PCU 18 includes an electric power converter (inverter) equipped with a plurality of switching elements which are not shown. When the vehicle is driven by the electric motor 14, the PCU 18 converts the DC power of the battery 16 to the AC power by appropriately turning these switching elements on and off, and then supplies the AC power to the electric motor 14.

The power transmission device 20 includes a plurality of power transmission components for transmitting the drive force of the electric motor 14 to each drive wheel 12. Components of a speed reduction device 22 (a drive gear 24, a driven gear 26, a countershaft 28, a drive gear 30 and a differential gear box 32) and drive shafts 34 (in FIG. 1, only one of which is shown) correspond to the plurality of power transmission components described here. More particularly, the electric motor 14 has an output shaft 14*a* to which the drive gear 24 engaged with the driven gear 26 is fixed. The drive gear 26 is fixed to one end of the countershaft 28, and the drive gear 30 is fixed to the other end of the countershaft 28. The differential gear box 32 has a ring gear 32*a* with which the drive gear 30 is engaged. The differential gear box 32 is coupled to one end of each drive shaft 34, and the drive wheel 12 is coupled to the other end of each drive shaft 34.

The above described plurality of power transmission components of power transmission device 20 are engaged with each other via gear portions (not shown) or spline portions (not shown) of the components (such as the drive gear 24) of the speed reduction device 22. Because of this, there is a backlash (looseness) between each power transmission member. As just described, the electric motor 14 is coupled to each drive wheel 12 via the plurality of power transmission components having a backlash therebetween.

The electrified vehicle system 10 is further provided with a control device 40 for controlling the electric motor 14 and the PCU 18. The control device 40 includes an electronic control unit (ECU) having a processor 40*a* and a memory 40*b*. The memory 40*b* stores programs for controlling the operation of the electrified vehicle system 10. The processor 40*a* reads a program from the memory 40*b* and executes it. It should be noted that the control device 40 may be configured using a plurality of ECUs.

The control device 40 receives sensor signals from various sensors for controlling the operation of the electrified vehicle system 10. The various sensors mentioned here include a vehicle wheel speed sensor 42, a motor angular velocity sensor 44 and an accelerator position sensor 46. The vehicle wheel speed sensor 42 outputs a signal responsive to the angular velocity ωw of the drive wheel 12. The motor angular velocity sensor 44 outputs a signal responsive to the angular velocity ωm of the electric motor 14. The accelerator position sensor 46 outputs a signal responsive to the amount of depression of the accelerator pedal (i.e., accelerator position) of the vehicle.

1-2. Feedforward (F/F) Vibration Reduction Control

According to the electrified vehicle system 10 of the present embodiment, in order to reduce (or damp) the vibration (shock) generated in the vehicle in response to acceleration or deceleration of the vehicle, the control device 40 executes an F/F vibration reduction control.

Figure 2:
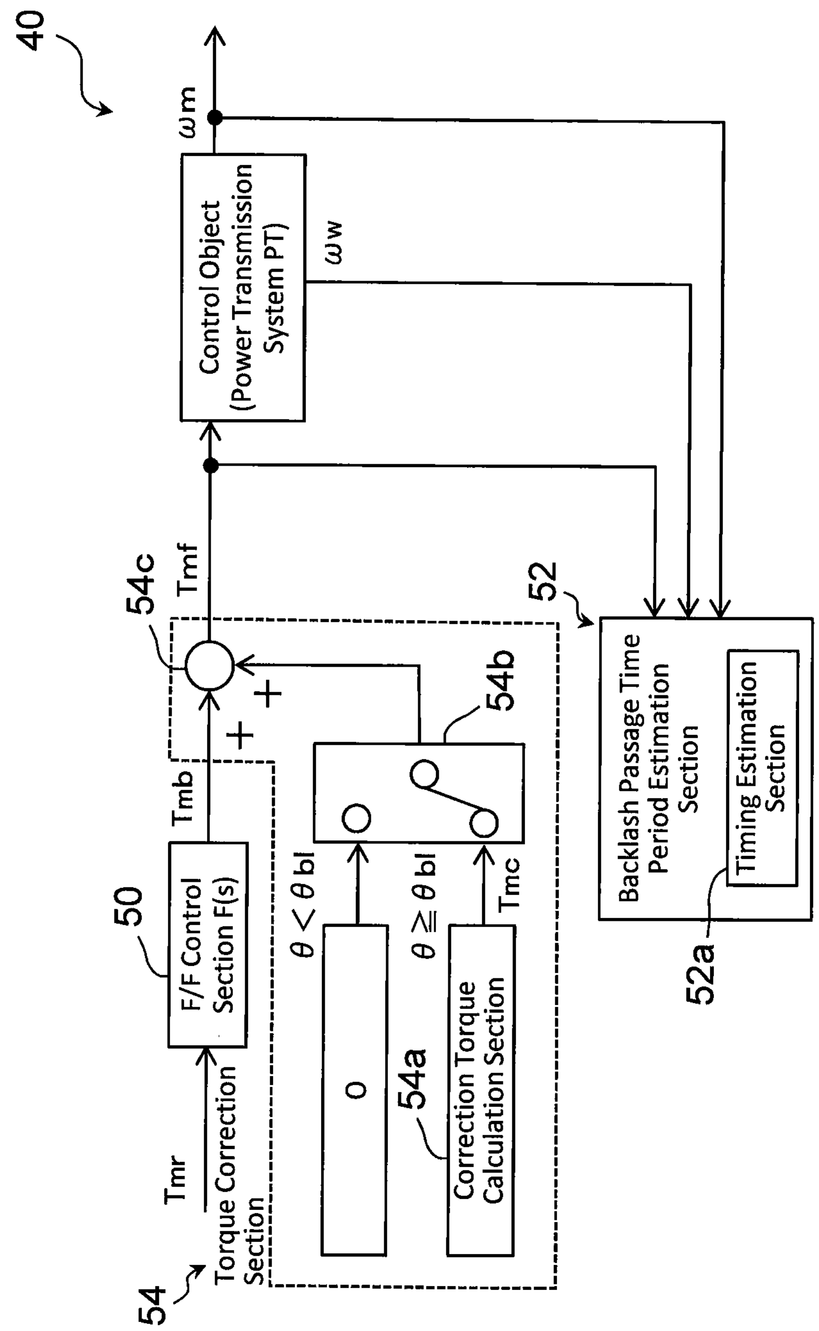
FIG. 2 is a block diagram concerning an F/F vibration reduction control according to the first embodiment of the present disclosure.

FIG. 2 is a block diagram concerning the F/F vibration reduction control according to the first embodiment of the present disclosure. The control device 40 includes (i.e., is configured to act as) a feedforward (F/F) control section 50, a backlash passage time period estimation section (hereinafter, simply referred to as a "backlash estimation section") 52, and a torque correction section 54. The plant (i.e., control object) in the control system shown in FIG. 2 is a "power transmission system PT (Power Train) from the electric motor 14 to the drive wheel 12".

In an electrified vehicle provided with an electric motor as a drive source, it is possible to increase the acceleration response using the characteristics of the electric moto having a high response. However, if the electric motor generates a stepped torque to increase the acceleration response, a torsional vibration (shock) of the power transmission system (for example, a drive shaft) is generated. In addition, this kind of torsional vibration is generated not only during acceleration but also during deceleration.

As described below in detail, the F/F control section 50 included in the control device 40 according to the present embodiment has a function as a filter to reduce a natural resonance frequency component of the control object (power transmission system PT) included in a required torque Tmr from a driver of the vehicle. When the vehicle is caused to be further accelerated during the vehicle being driven by the torque of the electric motor 14, the electric motor 14 is controlled in accordance with a base command torque Tmb outputted from this kind of F/F control section 50 and the torsional vibration described above can thereby be well reduced.

On the other hand, in a scene of transitioning from the deceleration state (coasting state) of the vehicle to the acceleration state (vehicle driving state by the electric motor), not only the torsional vibration described above but also vibration (shock) excited due to the elimination of the backlash between the plurality of power transmission components (i.e., due to a collision of facing gear tooth surfaces) are generated in the power transmission system PT. Hereinafter, this vibration is also simply referred to as a "backlash vibration". It should be noted that, on the contrary to the above, this kind of backlash vibration is also generated in a scene of transitioning from the acceleration state of the vehicle to the deceleration state. Accordingly, in order to also reduce the backlash vibration, the control device 40 according to the present embodiment includes a backlash estimation section 52 and a torque correction section 54, which will be described below in detail.

1-2-1. Torsional Model of Power Transmission System PT

Figure 3:
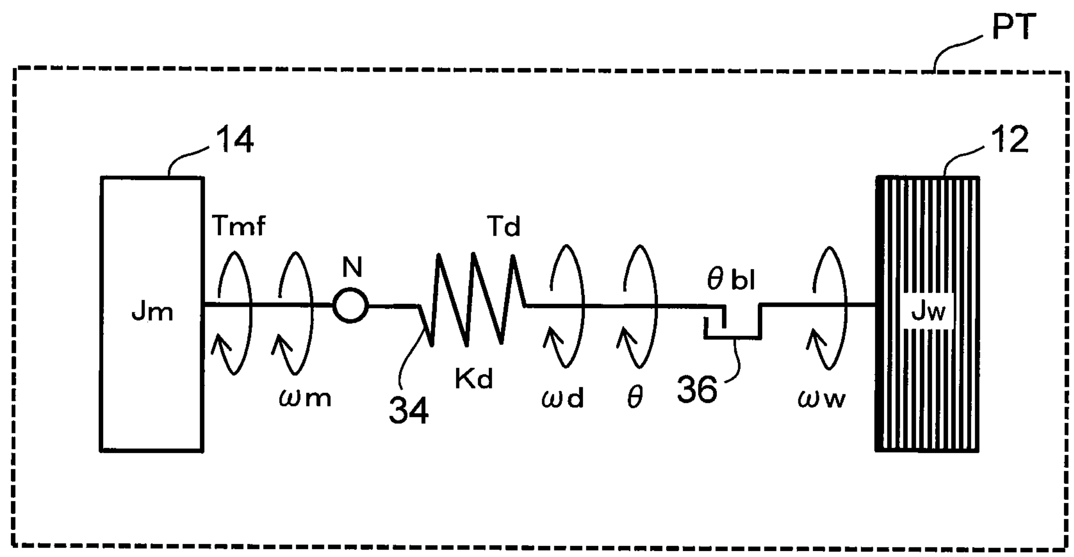
FIG. 3 is a schematic diagram showing a torsional model of a power transmission system PT used in the F/F vibration reduction control according to the first embodiment of the present disclosure.

FIG. 3 is a schematic diagram showing a torsional model of the power transmission system PT used in the F/F vibration reduction control according to the first embodiment of the present disclosure. This torsional model is obtained by modeling the power transmission system PT (i.e., the control object) of the electrified vehicle system 10. Each element between the electric motor 14 being the drive source and the drive wheel (tire) 12 has a spring element and inertia. It is assumed herein that backlashes of all of the gear portions and spline portions of the power transmission PT collectively exist, as a backlash element 36, at the end of the drive shaft 34 located on the side of the drive wheel 12. Based on this assumption, the inertias of the individual elements located on the side closer to the electric motor 14 (the drive source side) than the backlash element 36 can be regarded as one inertia Jm by using the equivalently conversion.

Furthermore, in FIG. 3, a symbol Jw is the inertia of the drive wheel 12. A symbol Tmf is the final command torque of the electric motor 14 and a symbol Td is the drive shaft torque. A symbol N is the overall gear ratio of the power transmission device 20. Symbols ωm, ωd and ωw are the angular velocities of the electric motor 14, the drive shaft 34 and the drive wheel 12, respectively. A symbol θ is the integrated relative angle described below and calculated by the backlash estimation section 52. A symbol θbl is used in the backlash estimation section 52 as described below. A symbol Kd is the torsional rigidity of the drive shaft 34.

1-2-2. Feedforward (F/F) Control

A transfer function simulating the vibration transmission characteristics of the power transmission system PT is referred to as G'(s). This transfer function G'(s) can be determined in advance on the basis of the specifications of the power transmission system PT, such as the torsional rigidity Kd of the drive shaft 34 and the respective inertias Jm and Jw of the electric motor 14 and the drive wheel 12.

As an example, the F/F control section 50 is configured based on an inverse function F(s) of the transfer function G'(s). As shown in FIG. 2, the F/F control section 50 receives the required torque Tmr of the electric motor 14 as an input, and outputs the base command torque Tmb. To be more specific, as an example, the transfer function F(s) of the F/F control section 50 can be expressed as in the following Equation (1), and the details of the transfer function F(s) is described in JP 2000-217209 A1. A symbol τ is the time constant of the transfer function F(s), and a symbol s is the Laplacian. Then, a symbol G'(0) corresponds to the ratio (=Td(s)/Tmf(s)) of the drive shaft torque Td(s) to the final command torque Tmf(s) in Equation (2) described below, that is, the gear ratio N (speed reduction ratio) of the power transmission device 20 shown in FIG. 3.

$$F(s) = \frac{G'(0)}{G'(s)\cdot(\tau s+1)^2} \tag{1}$$

According to the F/F control section 50 configured as described above, the characteristics opposite to the vibration transmission characteristics of the power transmission system PT which is the control object is given to the base command torque Tmb (i.e., the compulsory force). That is to say, it is possible to reduce the natural resonance frequency component of the power transmission system PT included in the required torque Tmr. With the use of the base command torque Tmb thus determined, the torsional vibration described above can be effectively reduced.

It should be noted that the required torque Tmr based on a driver request is calculated as, for example, a value depending on the accelerator position. In addition, in order to calculate the required torque Tmr, the vehicle information, such as vehicle speed, may be used in addition to the accelerator position.

1-2-3. Backlash Passage Time Period Estimation Section (Backlash Estimation Section)

Figure 4:
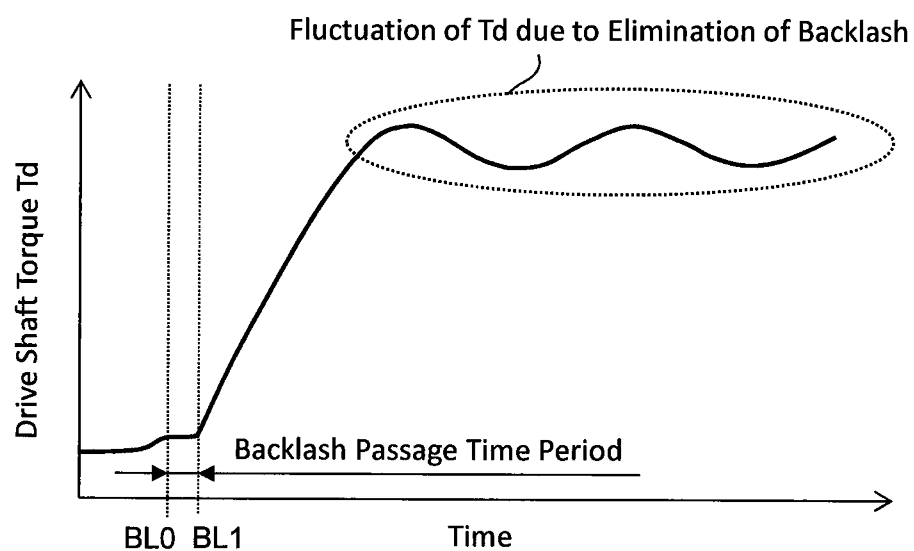
FIG. 4 is a graph used to describe a backlash passage time period.

FIG. 4 is a graph used to describe the backlash passage time period. In FIG. 4, a time waveform of the drive shaft torque Td is represented by referring to a scene in which the vehicle accelerates from a decelerating state (coasting state) as an example. It should be noted that FIG. 4 represents an example of the waveform obtained when measures to reduce the backlash vibration (i.e., the F/F vibration reduction control according to the present embodiment) are not made.

The backlash passage (reduction) time period mentioned here corresponds to a time period (BL0-BL1) from a timing BL0 to a timing BL1 shown in FIG. 4. The timing BL0 corresponds to the timing when the backlash of the backlash element 36 in the torsional model of the power transmission system PT shown in FIG. 3 starts to decrease in response to the transitioning from the deceleration state to the acceleration state. On the other hand, the timing BL1 corresponds to the timing at which the backlash passage time period ends, that is, the timing when the backlash is eliminated (in more detail, the timing at which the backlash finishes decreasing).

The backlash estimation section 52 includes a timing estimation section 52*a*. The timing estimator 52*a* is configured to estimate, based on "information on the power transmission system PT", the timing BL1 at which the backlash is eliminated. In detail, the arrival of the timing BL1 can be estimated by, for example, the following method. Parameters used as the "information on the power transmission system PT" in the following estimation method are the final command torque Tmf, the inertia Jm, the motor angular velocity ωm (the last value), the longitudinal force Ft, the inertia Jw, the radius R and the wheel angular velocity cow (the last value).

The backlash estimation section 52 first estimates the timing BL0 required for the estimation of the timing BL1 based on the method described here. As an example, the estimation of the timing BL0 can be performed using the following Equation (3). Where the Laplace conversion of the final command torque Tmf of the electric motor 14 is Tmf(s) and the Laplace conversion of the drive shaft torque Td is Td(s), the transfer function for calculating the drive shaft torque Td from the final command torque Tmf can be expressed as G'(s)·F(s) as in the following Equation (2). Then, Equation (3) is obtained by substituting the relationship of Equation (1) described above into the transfer function F(s) of the F/F control section 50 in Equation (2). The backlash estimation section 52 continuously calculates the drive shaft torque Td using the equation of motion shown in Equation (3) during operation of the vehicle. The drive shaft torque Td becomes zero when the backlash passage time period arrives. Because of this, the backlash estimation section 52 can estimate that the timing BL0 is the time when the estimated value of the drive shaft torque Td using this equation of motion becomes zero.

$$Td(s) = G'(s)\cdot F(s)\cdot Tmf(s) \tag{2}$$

$$Td(s) = \frac{G'(0)}{(\tau s+1)^2}\cdot Tmf(s) \tag{3}$$

Next, the timing estimation section 52*a* starts calculating an integrated relative angle θ shown in FIG. 3 from the arrival of the timing BL0 estimated as described above. The calculation of the integrated relative angle θ can be performed by, for example, a method using the following Equations (4) to (11). Equation (4) shows an equation of motion of the electric motor 14, equation (5) shows an equation of motion of the drive wheel 12. It should be noted that, in equation (5), symbols R and Ft are the radius and the longitudinal force of the drive wheel (tire) 12, respectively. The symbol Ft can be calculated, for example, using an equation of motion of the vehicle body (Ft−Fr=M·α), based on a running resistance Fr and a vehicle body acceleration a which are calculated or detected separately, and a known vehicle body weight M.

$$Jm\cdot\frac{d\omega m}{dt} = Tmf - \frac{Td}{N} \tag{4}$$

$$Jw\cdot\frac{d\omega w}{dt} = Td - R\cdot Ft \tag{5}$$

During the backlash passage time period (BL0-BL1), the drive shaft torque Td becomes zero as described above. Therefore, Equations (4) and (5) described above are simplified as the following Equations (6) and (7). Equation (8) is a formula for calculating an angular velocity ωm of the electric motor 14 (hereinafter, also simply referred to as a "motor angular velocity ωm"), it can be derived by integrating both sides of Equation (6) with respect to time t and then arranging the obtained relationship. Equation (9) which is a formula for calculating an angular velocity of the drive wheel 12 cow (hereinafter, also simply referred to as a "wheel angular velocity cow") can also be similarly derived from Equation (7).

$$Jm\cdot\frac{d\omega m}{dt} = Tmf \tag{6}$$

$$Jw\cdot\frac{d\omega w}{dt} = -R\cdot Ft \tag{7}$$

-continued $$\omega m = \int \frac{Tmf}{Jm} dt \tag{8}$$

$$\omega w = \int -\frac{R \cdot Ft}{Jw} dt \tag{9}$$

By substituting the current value of the final command torque Tmf and a known inertia Jm into Equation (8) to solve Equation (8), the current value of the motor angular velocity ωm can be calculated for each designated control period. Similarly, by substituting the current value of the longitudinal force Ft of the drive wheel 12 calculated separately, a known inertia Jw and the radius R of the drive wheel 12 into Equation (9) to solve Equation (9), the current value of the wheel angular velocity cow can be calculated for each designated e control period. In the backlash passage time period, the torque (final command torque Tmf) given to the drive source (electric motor 14) is used to change the angular acceleration dωm/dt of the inertia Jm located on the side closer to the drive source than the backlash element 36, and is not used to change the angular acceleration dωw/dt of the inertia Jw of the drive wheel 12.

To be more specific, the values of the motor angular velocity ωm and the wheel angular velocity cow obtained by solving Equations (8) and (9) respectively correspond to variation values ωm_hat and ωw_hat of the angular velocities ωm and ωw in the individual control periods. Because of this, the current value of the motor angular velocity ωm is calculated as the sum of this variation value ωm_hat and the last value of the motor angular velocity ωm (e.g., a detected value by the motor angular velocity sensor 44). Similarly, the current value of the wheel angular velocity ωw is calculated as the sum of the variation value ωw_hat and the last value of the wheel angular velocity ωw (e.g., a detected value by the vehicle wheel speed sensor 42).

Based on the current values of the motor angular velocity ωm and the wheel angular velocity ωw that are obtained as described above and the following Equation (10), the current value of a relative angular velocity cop being the relative angular velocity of the motor angular velocity ωm with respect to the wheel angular velocity ωw can be calculated for each control period. During the backlash passage time period, the difference between the motor angular velocity ωm and the angular velocity cod of the drive shaft 34 becomes zero. Thus, the relative angular velocity cop becomes equal to the relative angular velocity of the angular velocity ωd of the drive shaft 34 with respect to the wheel angular velocity ωw. On that basis, by integrating the obtained relative angular velocity cop using the following Equation (11), a relative angle θp being the relative angle of the electric motor 14 with respect to the drive wheel 12 (i.e., the relative angle of the drive shaft 34 with respect to the drive wheel 12) can be calculated for each control period.

$$\omega p = \omega m - \omega w \tag{10}$$

$$\theta p = \int \omega p dt \tag{11}$$

Accordingly, by starting the integration of the relative angle θp from the timing BL0 when the backlash starts to be eliminated, the integrated value of the relative angle θp in each control period during the backlash passage time period can be calculated as the integrated relative angle θ after the start of passage of the backlash (i.e., as the sum of the relative angles that have changed in order to eliminate the backlash).

After the arrival of the timing BL0, the timing estimation section 52*a* determines whether or not the integrated relative angle θ calculated as described above becomes equal to or greater than the backlash amount θbl. The backlash amount θbl is set as a value equal to, for example, the amount of backlash of the backlash element 36 (i.e., the amount of overall backlash of all the gear portions and spline portions located between the electric motor 14 and the drive wheel 12). The timing estimation section 52*a* estimates that the timing BL1 at which the backlash is eliminated is when the integrated relative angle θ reaches the backlash amount θbl.

1-2-4. Torque Correction Section

The torque correction section 54 is configured to apply, to the base command torque Tmb, a correction torque Tmc for reducing the backlash vibration (i.e., the vibration generated in the power transmission system PT due to the elimination of the backlash) in response to the arrival of the timing BL1 estimated by the timing estimation section 52*a*. In detail, as an example, the torque correction section 54 includes a correction torque calculation section 54*a*, a torque switching section 54*b* and a torque addition section 54*c* as shown in FIG. 2.

The correction torque calculation section 54*a* calculates a correction torque Tmc which is added to the base command torque Tmb when the timing BL1 arrives. The correction torque Tmc is applied to generate an opposite phase torque with respect to a fluctuation waveform of the drive shaft torque Td (i.e., a waveform exemplified in FIG. 4) in order to reduce the fluctuation in the drive shaft torque Td caused by the elimination of the backlash.

To be more specific, a sine wave of the natural resonance frequency component of each element (i.e., each element associated with the inertia Jm) located on the side closer to the electric motor 14 than the backlash element 36 (i.e., located on the drive source side) in the power transmission system PT shown in FIG. 3 is applied as the correction torque Tmc. However, if the kind of sine wave correction torque Tmc continues to be applied for a long time, the applied sine wave acts as a compulsory force on the power transmission system PT, and conversely causes the fluctuation in the drive shaft torque Td.

Accordingly, in the present embodiment, the waveform of the correction torque Tmc is set using a damping coefficient adjusted such that the sine wave is appropriately damped and converges. More particularly, the magnitude of the damping coefficient is predetermined in advance in accordance with a fluctuation waveform of the assumed drive shaft torque Td. That is to say, by adjusting the magnitude of the damping coefficient, the time period of applying an opposite phase torque as the correction torque Tmc is appropriately adjusted.

Moreover, the amplitude of the sine wave of the correction torque Tmc is given from, for example, a map stored in the memory 40*b*. In detail, for example, it is possible to use a map A that defines a relationship between the magnitude of the slope (i.e., time change rate) of the base command torque Tmb during acceleration or deceleration accompanied by the elimination of the backlash and the amplitude of the sine wave. In addition, in this map A, the amplitude of the sine wave may be, for example, set to be greater when this slope is greater. Furthermore, in order to calculate the amplitude of the sine wave, a map B which defines, for example, a relationship between the vehicle information (such as the vehicle speed) and the amplitude of the sine wave may be used in addition to or instead of the map A.

The torque switching section 54*b* changes the value (0 or Tmc) of the correction torque which is outputted to the torque addition section 54*c*, in accordance with the results of determination of the presence or absence of the arrival of the timing BL1 by the timing estimation section 52*a*. The torque addition section 54*c* adds the correction torque outputted from the torque switching section 54*b* to the basic command torque Tmb to calculate the final command torque Tmf.

To be more specific, when the integrated relative angle θ is smaller than the backlash amount θbl, that is, when it is determined by the timing estimation section 52*a* that the timing BL1 has not yet arrived, the torque switching section 54*b* outputs zero as the correction torque, as shown in FIG. 2. Therefore, in this situation, the correction of the base command torque Tmb using the correction torque Tmc is not performed. In other words, the final command torque Tmf becomes equal to the base command torque Tmb.

On the other hand, when the integrated relative angle θ becomes greater than or equal to the backlash amount θbl, that is, when the arrival of the timing BL1 is estimated, the torque switching section 54*b* outputs the correction torque Tmc calculated by the corrected torque calculation section 54*a*, as shown in FIG. 2. Therefore, in this situation, the correction of the base command torque Tmb using the correction torque Tmc is performed. As a result, the final command torque Tmf is calculated as the sum of the base command torque Tmb and the correction torque Tmc.

Next, from the mechanism of generation of the fluctuation of the drive shaft torque Td caused by the elimination of the backlash, the timing of applying the correction torque Tmc will be described. This torque fluctuation is considered to be generated as a result of a torque being transiently inputted and transmitted to the drive shaft 34 in response to the elimination of the backlash. Therefore, it is considered to be appropriate to apply the correction torque Tmc from the timing BL1 at which the backlash is eliminated. In this regard, according to the torque correction section 54 of the present embodiment having the above described configuration, when the arrival of the timing BL1 is estimated by the timing estimation section 52*a*, the torque switching section 54*b* immediately outputs the correction torque Tmc calculated by the correction torque calculation section 54*a* to the torque addition section 54*c*. Because of this, it is possible to start the application of the correction torque Tmc in a feedforward manner in response to the arrival of the timing BL1.

1-2-5. Processing by Control Device

Figure 5:
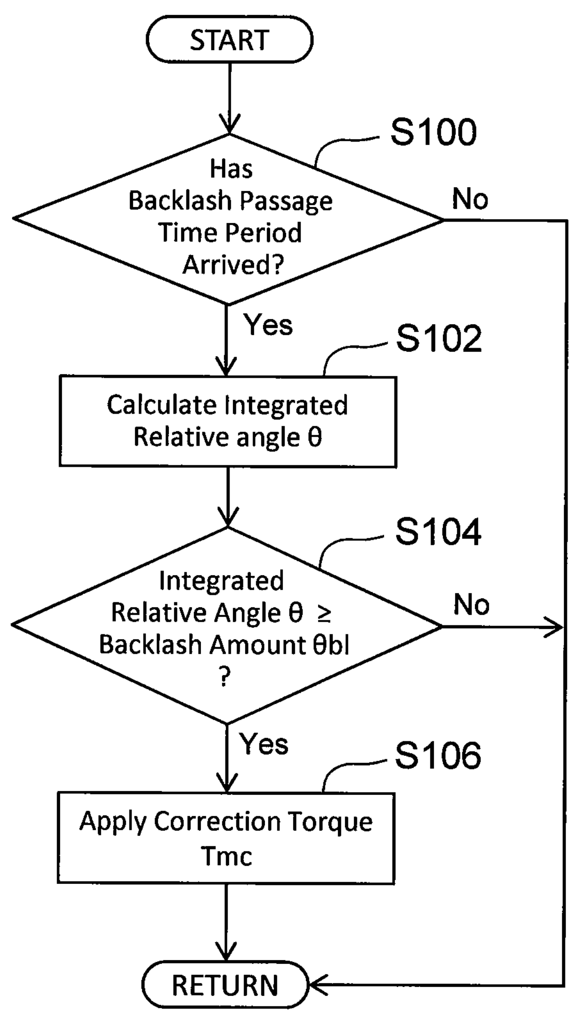
FIG. 5 is a flowchart illustrating a routine of processing regarding a torque correction based on a correction torque Tmc in the F/F vibration reduction control according to the first embodiment of the present disclosure.

FIG. 5 is a flowchart illustrating a routine of processing regarding the torque correction based on the correction torque Tmc in the F/F vibration reduction control according to the first embodiment of the present disclosure. It should be noted that the F/F vibration reduction control itself is continuously executed basically during operation of the electrified vehicle system 10. In addition, the control device 40 executes the processing of the routine repeatedly for each control period during execution of the F/F vibration reduction control.

According to the routines shown in FIG. 5, first, in step S100, the control device 40 (more specifically, backlash estimation section 52) determines whether the backlash passage time period (BL0-BL1) has arrived or not. This determination can be performed by, for example, determining whether the timing BL0 has arrived or not, as described above.

When the determination result of step S100 is negative, that is, when the backlash passage time period has not arrived, the control device 40 ends the current process cycle. When, on the other hand, the determination result is positive, that is, when it is determined that the backlash passage time period has arrived, the processing proceeds to step S102. It should be noted that the processing of the following steps S102 to S106 is executed when the backlash time passage period arrives as a result of the vehicle accelerating from the decelerating state, and the processing is also executed when the backlash passage time period arrives as a result of the vehicle decelerating from the accelerating state.

In step S102, the control device 40 (more specifically, the timing estimation section 52*a* of the backlash estimation section 52) calculates the integrated relative angle θ using the method described above. Thereafter, the processing proceeds to step S104.

In step S104, the control device 40 (more specifically, the timing estimation section 52*a*) determines whether or not the integrated relative angle θ calculated in step S102 is equal to or greater than the backlash amount θbl described above.

When the determination result of step S104 is negative, that is, when the control device 40 determines that the timing BL1 at which the backlash is eliminated has not yet arrived, the control device 40 ends the current processing cycle. When, on the other hand, this determination result is positive, that is, when the arrival of the timing BL1 is estimated, the processing proceeds to step S106.

In step S106, the control device 40 (more specifically, the torque correction section 54) calculates the correction torque Tmc using the method described above, and also calculates the final command torque Tmf by adding this correction torque Tmc to the base command torque Tmb. Then, the control device 40 applies the calculated final command torque Tmf to the electric motor 14.

1-3. Effects

According to the F/F vibration reduction control of the electrified vehicle system 10 of the present embodiment described so far, in order to calculate the base command torque Tmb based on the required torque Tmr, the F/F control section 50 is used, which is configured based on the inverse function F(s) of the transfer function simulating the vibration transmission characteristics of the power transmission system PT. Thus, the above described torsional vibration generated in response to the acceleration or deceleration of the vehicle can be effectively reduced by using the base command torque Tmb in which the natural resonance frequency component of the control object (i.e., the power transmission system PT) included in the required torque Tmr is reduced.

Figure 6:
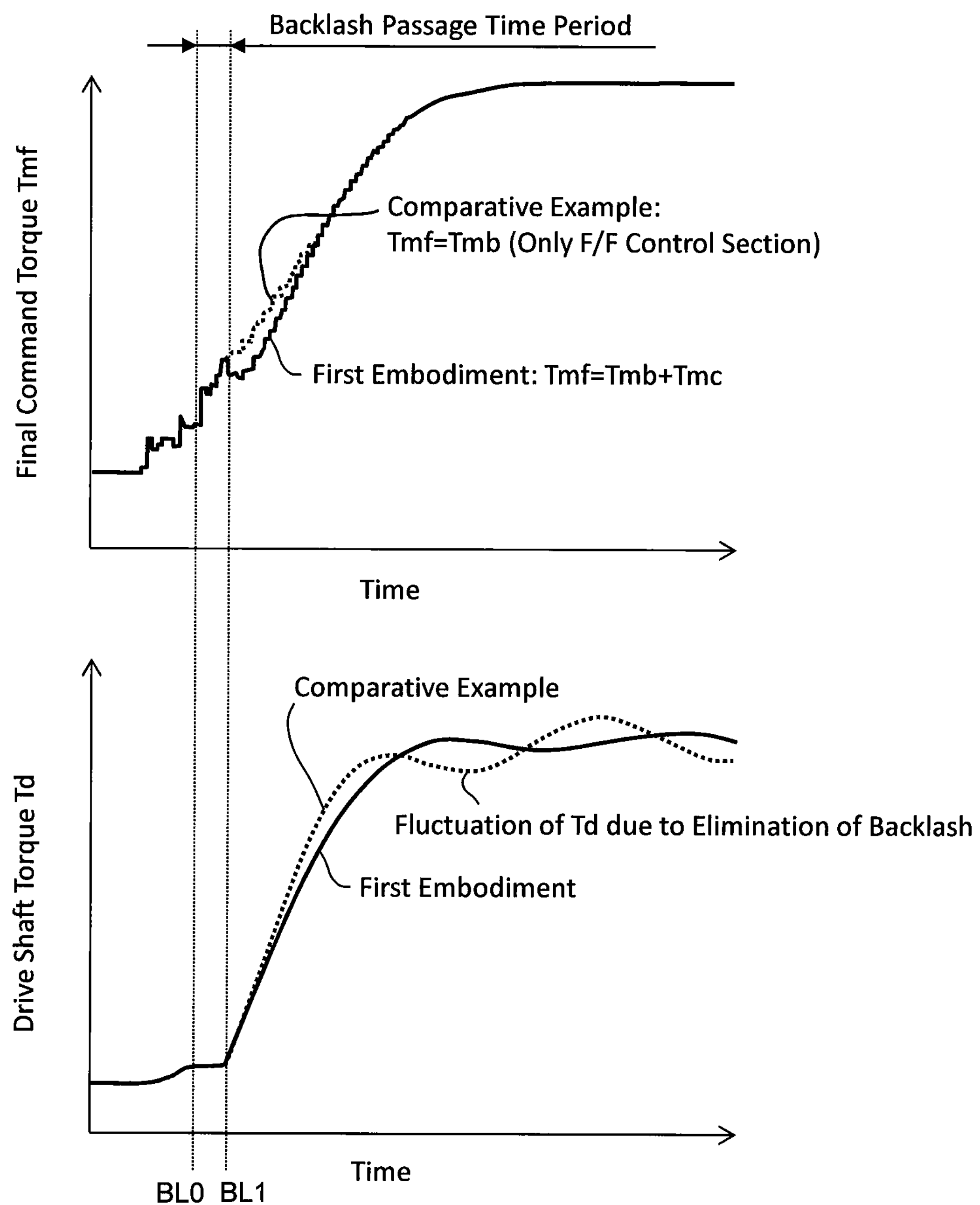
FIG. 6 is a graph used to describe an effect of improving vibration reduction by the use of the correction torque Tmc according to the first embodiment of the present disclosure.

On that basis, according to the F/F vibration reduction control, when the arrival of the timing BL1 at which the backlash is eliminated is estimated by the timing estimation section 52*a*, the correction torque Tmc for reducing the backlash vibration is applied to the base command torque Tmb in a feedforward manner. FIG. 6 is a graph used to describe the effect of improving vibration reduction by the use of the correction torque Tmc according to the first embodiment of the present disclosure.

In FIG. 6, the respective waveforms of the final command torque Tmf of the electric motor 14 and the drive shaft torque Td during acceleration of the vehicle accompanied by the passage of the backlash are compared between a "comparative example" and the "first embodiment". The "comparative example" mentioned here corresponds to an example in which the base command torque Tmb is used as the final command torque Tmf without using the correction torque Tmc during the acceleration.

From FIG. 6, according to the comparative example without using the correction torque Tmc, it can be seen that the fluctuation of the drive shaft torque Td generated due to the elimination of the backlash is not satisfactorily reduced.

On the other hand, according to the waveform of the present embodiment using the correction torque Tmc, it can be seen that the torque fluctuation is well damped (attenuated) as compared to the comparative example.

Moreover, according to the F/F vibration reduction control of the present embodiment, during the power transmission system PT being estimated to be in the backlash passage time period (i.e., the dead band), the torque (final command torque Tmf) of the electric motor 14 is not continuously limited contrary to the control method disclosed in WO 2018/020679 A1. In addition, the present F/F vibration reduction control does not detect that the backlash is actually eliminated using some method and does not also start (or restart) a feedback control for correcting the torque of an electric motor to reduce the backlash vibration after the detection, but the present F/F vibration reduction control estimates the arrival of the timing BL1 and applies the correction torque Tmc in a feedforward manner in response to the arrival of the timing BL1. Therefore, it is possible to reduce the deterioration of the responsiveness of the acceleration or deceleration of the vehicle as a result of performing the reduction of the backlash vibration.

As described so far, according to the F/F vibration reduction control of the present embodiment, the backlash vibration can be reduced while reducing the deterioration of the responsiveness of the acceleration or deceleration of the electrified vehicle.

2. Second Embodiment

Next, a second embodiment according to the present disclosure will be described with reference to FIGS. 7 to 10. The electrified vehicle system according to the present embodiment is configured similarly to the electrified vehicle system 10 according to the first embodiment described above, except the following description.

2-1. F/F Vibration Reduction Control

Figure 7:
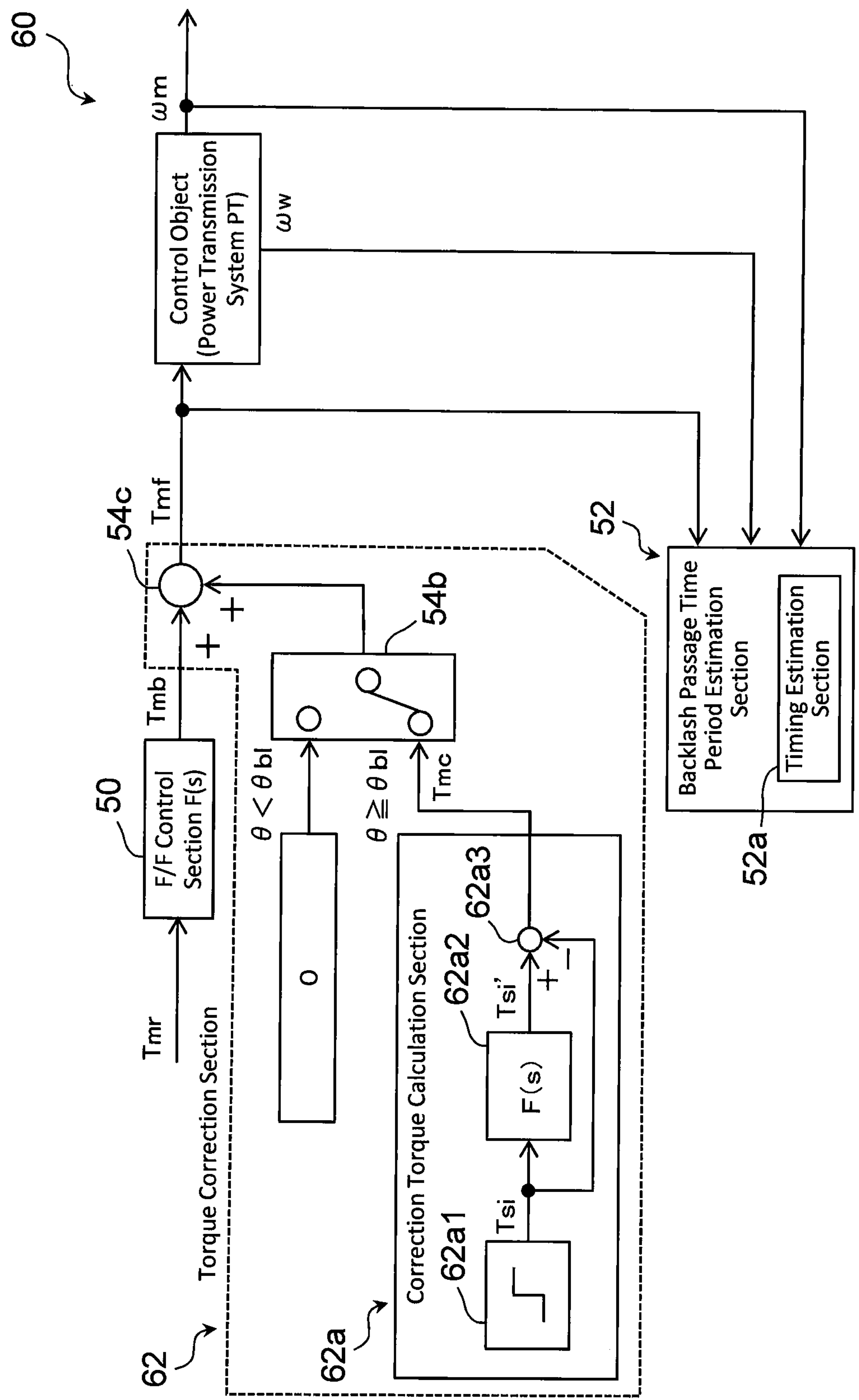
FIG. 7 is a block diagram regarding an F/F vibration reduction control according to a second embodiment of the present disclosure.

FIG. 7 is a block diagram regarding an F/F vibration reduction control according to the second embodiment of the present disclosure. The electrified vehicle system according to the present embodiment is provided with a control device 60 instead of the control device 40 shown in FIG. 2. The control device 60 includes a torque correction section 62. The torque correction section 62 is different from the torque correction section 54 in that it includes a correction torque calculation section 62*a* instead of the correction torque calculation section 54*a*.

As shown in FIG. 7, the correction torque calculation section 62*a* includes an input torque setting section 62*a*1, a filter processing section 62*a*2 and a subtraction section 62*a*3. In the calculation method of the correction torque Tmc by the correction torque calculation section 62*a*, the torque generated due to the elimination (gear rattle) of the backlash and inputted to the power transmission system PT is presumed to be a stepped input. The input torque setting section 62*a*1 sets this kind of torque as a stepped predicted torque Tsi. It should be noted that the predicted torque Tsi corresponds to an example of the "first predicted torque" according to the present disclosure.

Figure 8:
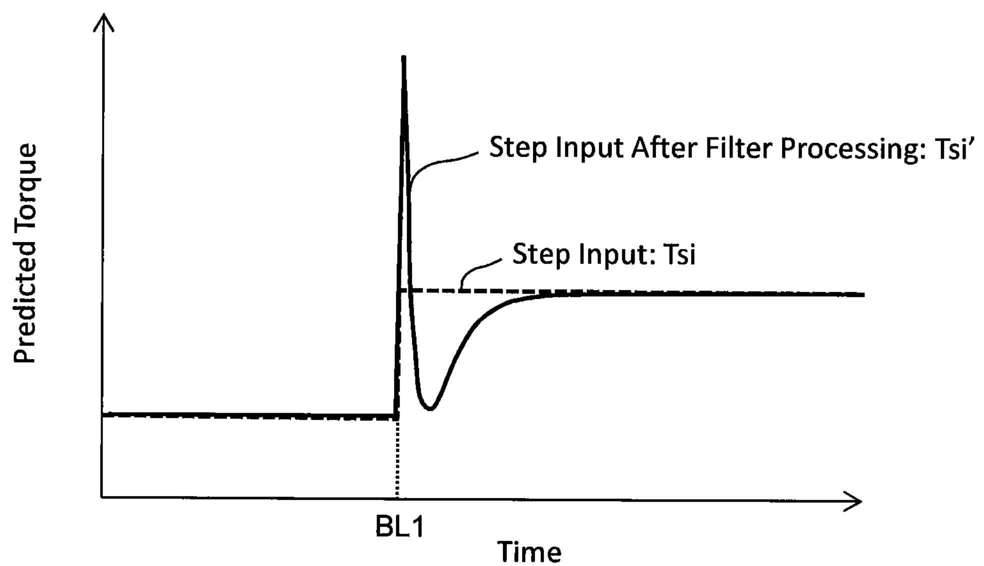
FIG. 8 is a graph showing an example of time waveforms of predicted torques Tsi and Tsi' shown in FIG. 7.

FIG. 8 is a graph showing an example of time waveforms of the predicted torques Tsi and Tsi' shown in FIG. 7. As shown in FIG. 8, the predicted torque Tsi set by the input torque setting section 62*a*1 changes in a stepwise manner at the timing BL1 estimated by the timing estimation section 52*a*. As the amount of change in the predicted torque Tsi (i.e., the amount of change in the torque inputted in a stepped shape), a fixed value which is set in advance may be used, for example, or this amount of change may be changed in accordance with the amount of change in the base command torque Tmb during acceleration or deceleration accompanied by the elimination of the backlash.

The predicted torque Tsi outputted from the input torque setting section 62*a*1 is inputted to the filter processing section 62*a*2. The transfer function of the filter processing section 62*a*2 is F(s), which is the same as that of the F/F control section 50. That is to say, the filter processing section 62*a*2 is configured to apply, to the first predicted torque Tsi, a filter processing for reducing the natural resonance frequency component of the power transmission system PT (control target).

The torque outputted from the filter processing section 62*a*2 (i.e., the torque in which the natural resonance frequency component included in the predicted torque Tsi is reduced) is referred to herein as a predicted torque Tsi'. This predicted torque Tsi' is represented as shown in FIG. 8. It should be noted that the predicted torque Tsi' corresponds to an example of the "second predicted torque" according to the present disclosure.

Figure 9:
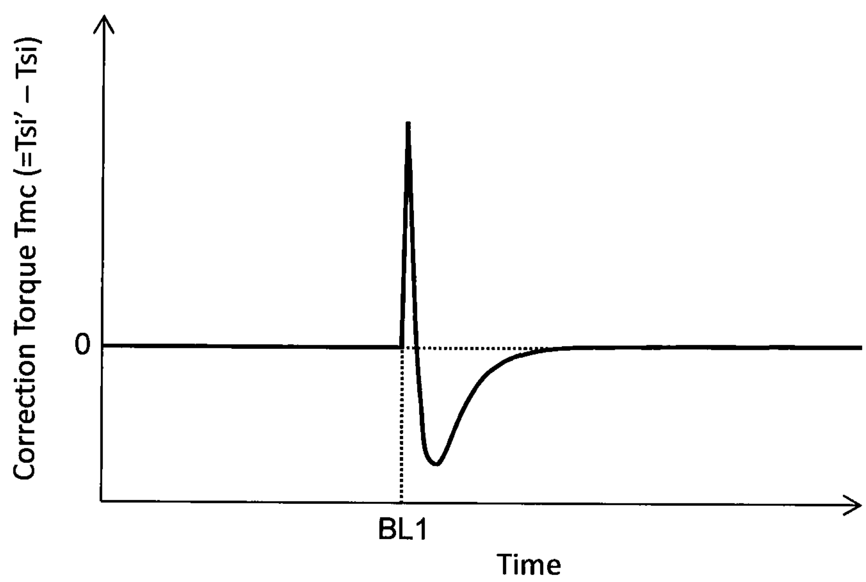
FIG. 9 is a graph showing an example of a time waveform of a correction torque Tmc shown in FIG. 7.

FIG. 9 is a graph showing an example of a time waveform of the correction torque Tmc shown in FIG. 7. The subtraction section 62*a*3 subtracts the predicted torque Tsi before the filter processing from the predicted torque Tsi' after the filter processing, and outputs the resulting value as the correction torque Tmc. The correction torque Tmc calculated as just described is represented as shown in FIG. 9. It should be noted that, in FIGS. 8 and 9, the waveforms of the predicted torques Tsi and Tsi' and correction torque Tmc in an example in which the vehicle accelerates from the decelerating state are represented. In contrast to this, the waveforms of the predicted torque Tsi and Tsi' and correction torque Tmc in an example in which the vehicle decelerates from the accelerating state are obtained by inverting the waveforms represented in FIGS. 8 and 9 in the vertical direction of the paper.

2-2. Effects

Figure 10:
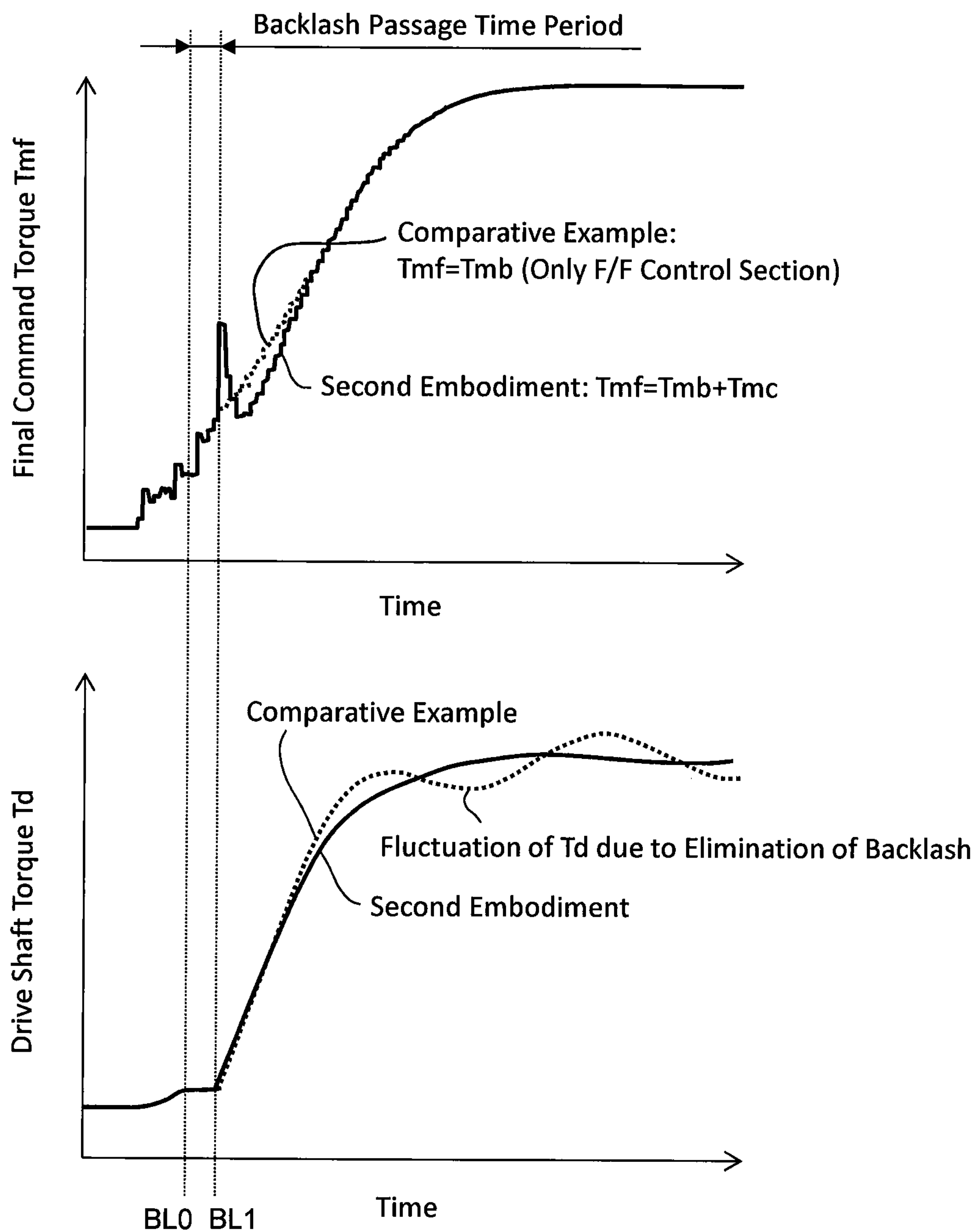
FIG. 10 is a graph used to describe an effect of improving vibration reduction by the use of the correction torque Tmc according to the second embodiment of the present disclosure.

FIG. 10 is a graph used to describe the effect of improving the vibration reduction by the use of the correction torque Tmc according to the second embodiment of the present disclosure.

If a stepped torque (such as the predicted torque Tsi), in which the natural resonance frequency component of the power transmission system PT is not reduced by the filter processing, is actually generated in response to the elimination of the backlash and is inputted to the power transmission system PT, a large backlash vibration may be generated due to the presence of the natural resonance frequency component. In contrast to this, if a torque (such as the predicted torque Tsi' after the filter processing), in which the natural resonance frequency component is reduced, is actually inputted, it is considered that, since the natural resonance frequency component is reduced, the backlash vibration caused by this stepped input can be well reduced.

According to the torque correction section 62 of the present embodiment described above, the torque obtained by subtracting the predicted torque Tsi before the filter processing from the predicted torque Tsi' in which the natural resonance frequency components of the power transmission system PT is reduced is used as the correction torque Tmc (=Tsi'-Tsi). In other words, the predicted torque Tsi' after the filter processing corresponds to the sum of the predicted torque Tsi before the filter processing and the correction torque Tmc (Tsi'=Tsi+Tmc). Therefore, when a stepped torque Tx as presumed as the predicted torque Tsi is actually generated in association with the elimination of the backlash and is inputted to the power transmission system PT, the correction torque Tmc can be applied to the stepped actual input torque Tx by the use of the final command torque Tmf including the correction torque Tmc. Namely, it is possible to reduce the natural resonance frequency component included in the actual input torque Tx by the use of the correction torque Tmc. Thus, as shown in FIG. 10, it is possible to favorably reduce the fluctuation of the drive shaft torque Td caused by the elimination of the backlash, and as a result, it is possible to favorably reduce the backlash vibration.

Furthermore, according to the F/F vibration reduction control of the present embodiment, the torque generated due to the elimination of the backlash and inputted to the power transmission system PT can be predicted as the predicted torque Tsi, prior to the arrival of the timing BL1 at which the backlash is eliminated. Then, the filter processing for the predicted torque Tsi can be performed prior to the arrival of the timing BL1. Because of this, it is possible to apply the correction torque Tmc to the final command torque Tmf in a feedforward manner in response to the arrival of the subsequent timing BL1. Thus, the F/F vibration reduction control according to the present embodiment makes it possible to cope with the backlash vibration by the use of the feedforward control.

As described so far, according to the F/F vibration reduction control of the present embodiment, the backlash vibration can be reduced while reducing the deterioration of the responsiveness of the acceleration or deceleration of the electrified vehicle.

3. Other Embodiments

Next, another example of the timing estimation section according to the present disclosure and other examples of the electrified vehicle applicable to the present disclosure will be described.

3-1. Another Example of Timing Estimation Section

The timing estimation section 52*a* described above uses Equations (4) to (11) to estimate the timing BL1 at which the backlash is eliminated. In the example of the timing estimation section 52*a*, as already described, the final command torque Tmf, the inertia Jm, the motor angular velocity ωm (the last value), the longitudinal force Ft, the inertia Jw, the radius R and the wheel angular velocity ωw (the last value) are used as the "information on the power transmission system PT".

In contrast to the above, in another example of the timing estimation section described here, only the motor angular velocity ωm and the wheel angular velocity ωw are used as the "information on the power transmission system PT". In this example, as will be described below in detail with reference to FIG. 11, the motor angular velocity ωm (the current value) during the backlash passage time period is estimated from a plurality of past values of the motor angular velocity ωm during the backlash passage time period. Similarly, the wheel angular velocity ωw (the current value) during the backlash passage time period is estimated from a plurality of past values of the wheel angular velocity ωw during the backlash passage time period. It should be noted that the method of calculating the relative angular velocity cop, the relative angle θp and the integrated relative angle θ after the motor angular velocity ωm and the wheel angular velocity ωw are obtained is the same as that of the timing estimation section 52*a* using Equations (10) and (11).

Figure 11:
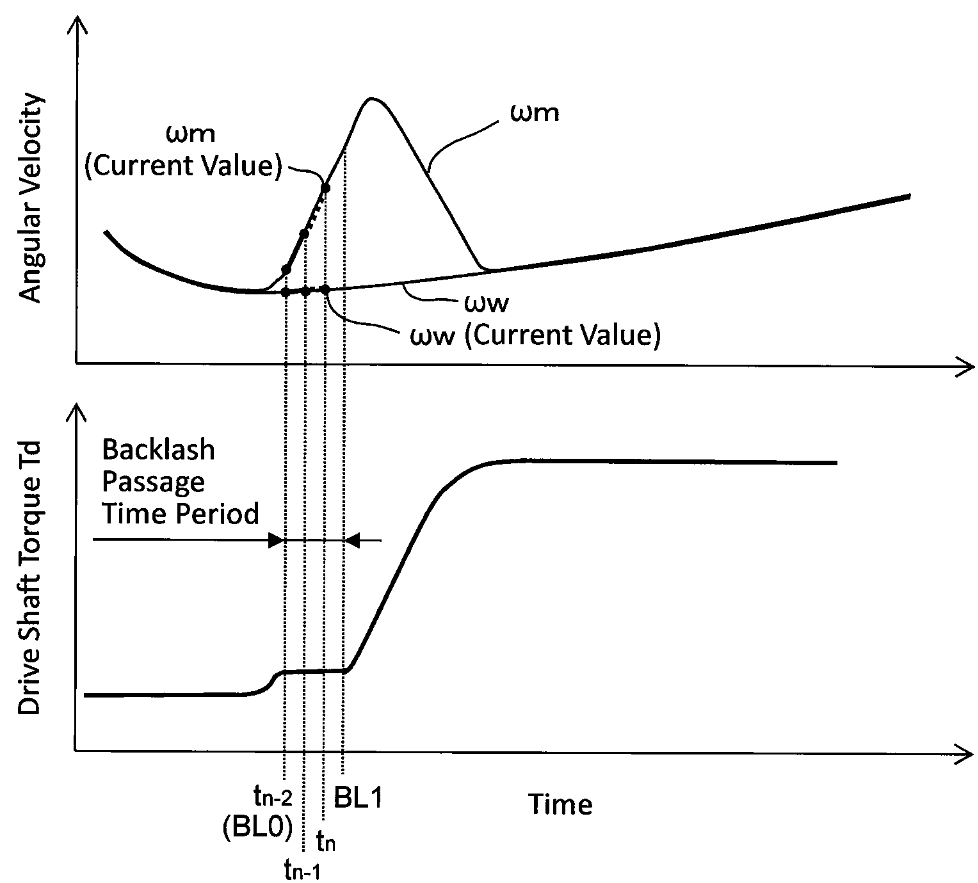
FIG. 11 is a graph used to describe an estimation method of a motor angular velocity ωm and a wheel angular velocity cow in another example of a timing estimation section according to the present disclosure.

FIG. 11 is a graph used to describe an estimation method of the motor angular velocity ωm and the wheel angular velocity ωw in another example of the timing estimation section according to the present disclosure. It should be noted that a scene in which the vehicle accelerates from a decelerating state is herein exemplified and explained, but this estimation method is similarly applicable to a scene in which the vehicle decelerates from an accelerating state.

The inertia Jw located on the side of the drive wheel 12 is disconnected from the inertia Jm located on the side of the drive source (electric motor 14) during the backlash passage time period. Because of this, if the final command torque Tmf of the electric motor 14 is increased when the vehicle accelerates, the motor angular velocity ωm as schematically shown in FIG. 11 increases. The motor angular velocity ωm decreases after the backlash is eliminated thereafter.

According to this estimation method, the motor angular velocity ωm at the current time point $t_n$ during the backlash passage time period is estimated from, as an example, the amount of change of the (actual) motor angular velocity ωm between two past time points $t_{n-1}$ and $t_{n-2}$ during the backlash passage time period, as shown in FIG. 11. The values of the motor angular velocity ωm at the time points $t_{n-1}$ and $t_{n-2}$ are detected using, for example, the motor angular velocity sensor 44. This kind of estimation of the motor angular velocity ωm at the time point $t_n$ can be performed using, for example, linear approximation. Also, the wheel angular velocity ωw at the time point $t_n$ during the backlash passage time period is similarly estimated from the amount of change in the (actual) wheel angular velocity ωw between two past time points $t_{n-1}$ and $t_{n-2}$ during the backlash passage time period.

The timing estimation section as described above may be applied to the first or second embodiment instead of the timing estimation section 52*a*.

In addition, in the timing estimation section 52*a* and the timing estimation section according to another example described above, the wheel angular velocity ωw (the current value) may be obtained using the following method instead of the previously described method. That is to say, in the backlash passage time period, the amount of change (=the current value−the last value) in the wheel angular velocity ωw which is on the driven side is minute as compared to the amount of change (=the current value−the last value) in the motor angular velocity ωm which is on the drive side. Because of this, for example, the last value of the wheel angular velocity ωw detected using the vehicle wheel speed sensor 42 may be used as the current value of the wheel angular velocity ωw. Alternatively, the current value of the wheel angular velocity ωw may be estimated based on, for example, additional parameters (such as the running resistance Fr and the road surface gradient) as well as the last value of the wheel angular velocity ωw detected as just described.

3-2. Other Examples of Electrified Vehicle

The electrified vehicle to which the electrified vehicle system 10 described above is applied includes only the electric motor 14 as the drive source, and also includes only the battery 16 as a power supply for operating the electric motor 14, as shown in FIG. 1. However, the electrified vehicle to which the present disclosure can be applied is not limited to the example described above, as long as it includes "an electric motor coupled to a drive wheel via a plurality of power transmission components". That is to say, the electrified vehicle according to the present disclosure may be, for example, a hybrid vehicle including an electric motor and another drive source (for example, an internal combustion engine). Furthermore, the electrified vehicle according to the present disclosure may be, for example, a vehicle (hybrid vehicle or fuel cell vehicle) including a battery for storing electric power supplied from the outside of the vehicle and another power supply (e.g., a generator for generating electric power using an internal combustion engine, or a fuel cell).

The embodiments and modification examples described above may be combined in other ways than those explicitly described above as required and may be modified in various ways without departing from the scope of the present disclosure.

What is claimed is:

1. An electrified vehicle system comprising:

an electric motor coupled to a drive wheel via a plurality of power train components; and a processor configured to:

input a required torque of the electric motor from a driver;

determine a base command torque of the electric motor based on: the required torque of the electric motor, and a transfer function simulating vibration transmission characteristics of a power train from the electric motor to the drive wheel;

output the base command torque of the electric motor;

estimate, based on information on the power train, a timing at which a backlash between the plurality of power train components is eliminated; and apply, to the base command torque, a correction torque for reducing a vibration generated in the power train due to elimination of the backlash, in response to an arrival of the estimated timing.

2. The electrified vehicle system according to claim 1, wherein the information on the power train includes an angular velocity of the electric motor and an angular velocity of the drive wheel, and wherein the processor is configured to calculate, based on a relative angular velocity of the angular velocity of the electric motor with respect to the angular velocity of the drive wheel, an integrated relative angle of the electric motor with respect to the drive wheel after a start of reduction of the backlash, and estimate that the timing is when a calculated integrated relative angle reaches a designated backlash amount.

3. The electrified vehicle system according to claim 1, wherein the correction torque has a phase opposite to a waveform of torque generated due to the elimination of the backlash and inputted into the power train.

4. The electrified vehicle system according to claim 1, wherein the processor is configured to:

set, as a stepped first predicted torque, a torque that is presumed to be generated due to the elimination of the backlash and inputted into the power train;

apply, to the first predicted torque, a filter processing to reduce a natural resonance frequency component of the power train and outputting a second predicted torque; and subtract the first predicted torque from the second predicted torque to calculate the correction torque.

5. A control method of controlling an electrified vehicle equipped with an electric motor coupled to a drive wheel via a plurality of power train components, and a processor, the control method comprising, using the processor:

inputting a required torque of the electric motor from a driver;

determining a base command torque of the electric motor based on: the required torque of the electric motor, and a transfer function simulating vibration transmission characteristics of a power train from the electric motor to the drive wheel;

outputting the base command torque of the electric motor;

estimating, based on information on the power train, a timing at which a backlash between the plurality of power train components is eliminated; and applying, to the base command torque, a correction torque for reducing a vibration generated in the power train due to elimination of the backlash, in response to an arrival of the estimated timing.

* * * * *